Jan. 23, 1923.
1,443,181
F. J. HILL, SR.
HOPPER FOR GRAVEL SCREENING PLANTS.
FILED JAN. 7, 1920.
2 SHEETS-SHEET 2
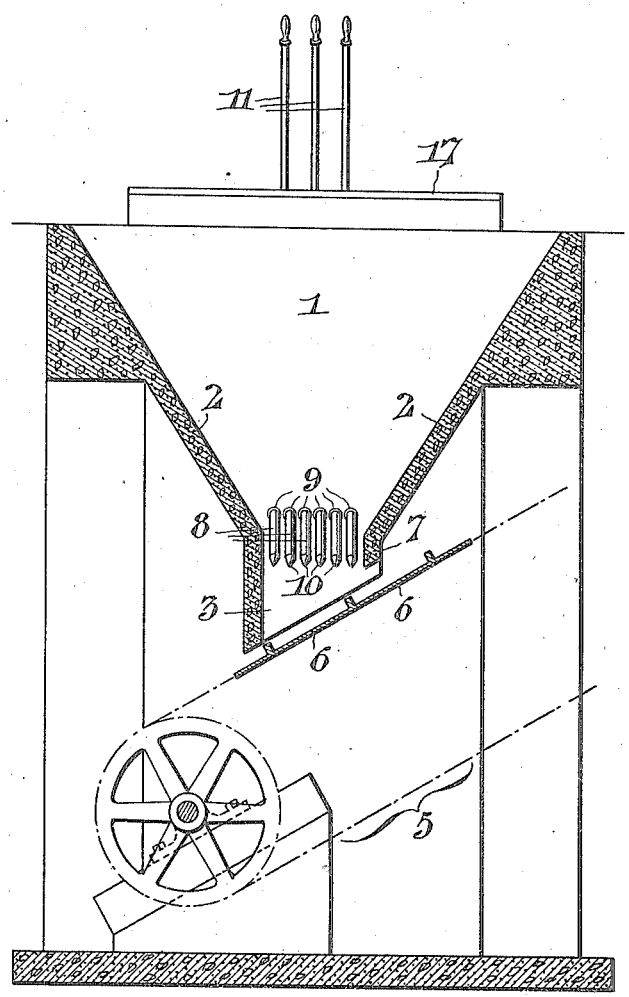
FIG. III.
FIG. IV.
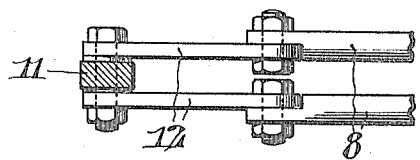
WITNESSES:
INVENTOR:
Francis J. Hill, Sr.
BY
ATTORNEYS.

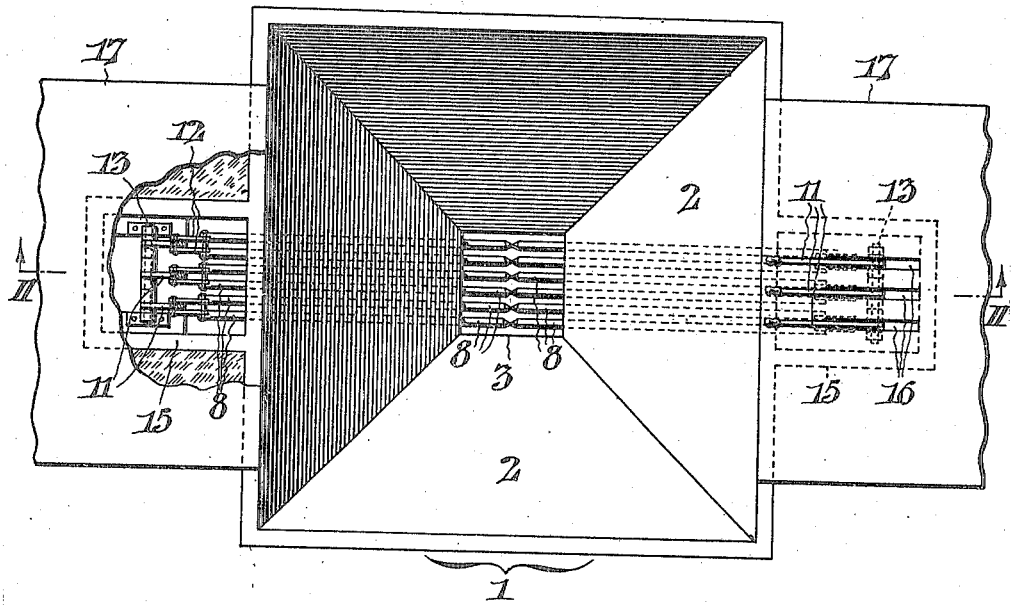
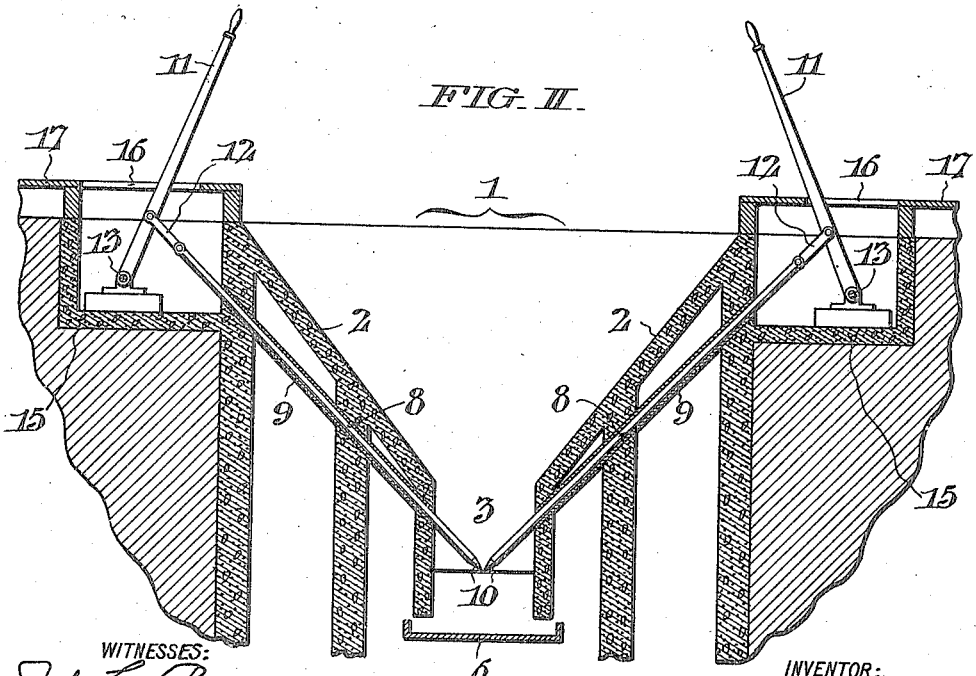

Patented Jan. 23, 1923.

1,443,181

UNITED STATES PATENT OFFICE.

FRANCIS J. HILL, SR., OF PHILADELPHIA, PENNSYLVANIA, ASSIGNOR TO CURTIS & HILL GRAVEL AND SAND COMPANY, OF PHILADELPHIA, PENNSYLVANIA, A CORPORATION OF PENNSYLVANIA.

HOPPER FOR GRAVEL-SCREENING PLANTS.

Application filed January 7, 1920. Serial No. 349,862.

*To all whom it may concern:*

Be it known that I, FRANCIS J. HILL, Sr., a citizen of the United States, residing in the city and county of Philadelphia and State of Pennsylvania, have invented certain new and useful Improvements in Hoppers for Gravel-Screening Plants, whereof the following is a specification, reference being had to the accompanying drawing.

The invention relates to feed hoppers for gravel screening plants, and more especially to means for effectively controlling the discharge from such hoppers.

In plants of the above class, the stone and gravel deposits removed from the earth are dumped in the natural condition of mixture, into a receiving hopper from which the material is fed or discharged onto an inclined conveyer, and thereby elevated to an appropriate height, so that the screening operations may be subsequently effected by gravitation in a well known manner. Heretofore, the discharge from such hoppers was unrestricted, and considerable trouble has, as a result, been experienced in preventing overloading of the conveyer, and the subsequent spilling of the material therefrom.

In order to overcome this difficulty, I have devised a gate for the hopper outlet whereby the flow of the material may be positively restricted and controlled to any desired degree, and the gate readily operated, notwithstanding the weighty and bulky nature of the contents of the hopper. The invention further provides for relieving any localized congestion or obstruction of the outlet opening, such as may be caused by lumping of the material, or larger stones contained in the natural mixture, without disturbing the adjustment of the gate as a whole.

The structure by which these results are attained will be best understood from the detailed description which follows.

In the drawings, Fig. I, is a plan view of the receiving hopper of a gravel screening plant conveniently embodying my invention.

Fig. II, is a sectional elevation of the same, as viewed in the direction of the arrows II—II, in Fig. I.

Fig. III, is a sectional view taken along a plane at right angles to that of Fig. II, and Fig. IV, is a detail of a portion of the gate mechanism by which the discharge from the hopper is controlled.

The receiving hopper 1, is herein represented as of concrete construction, and in practice is of ample capacity for receiving the crude material, a car load at a time. Said hopper has sloping sides 2, 2 so inclined as to direct the material downwardly to a quadrangular discharge outlet 3, which is preferably centrally located. The hopper overhangs the lower end of an inclined conveyer diagrammatically represented and comprehensively indicated at 5, in Fig. III, of the drawings. This conveyer serves to elevate the material for a purpose already hereinbefore noted.

The conveyer 5, may be of any approved construction and for purposes of illustration in the present instance it is conventionally represented as comprising a series of pans or trays 6 which receive the material from the discharge outlet of the hopper. All the walls of the outlet except the one indicated at 7, in Fig. III, extend into close proximity to the conveyer, so as to assist in preventing the spilling of the material over the edges of the trays. The wall 7, is purposely cut away to permit the free passage of the conveyer trays when loaded.

In order to control the flow of the material from the hopper, the discharge outlet is provided with a gate comprising a number of bars 8, arranged in two opposed series, penetrating to the interior through opposite walls of the outlet, and meeting at the center of the latter when the gate is completely closed as shown in Figs. I and II. These complementary series of gate bars are preferably arranged in planes, relatively inclined at a substantial angle to one another, and are here shown at inclinations corresponding substantially to the slopes of the hopper walls with which they are respectively associated. The bars 8, are guided for longitudinal sliding, in individual tubes 9, fixedly set into the hopper structure in any approved manner. The inner ends of the gate bars are pointed as at 10, so as to more readily find their way through the mass of the material, and their movement is further facilitated by their complementary downward inclination in the general direction of the flow through the hopper outlet, as best seen in Fig. III.

The gate bars may be individually operated, or any number of the two series may be coupled in groups as detailed in Fig. IV, depending upon the requirements met with in practice, i. e., the composition of the material which it is desired to control. In the present instance, each series comprises six bars, coupled in pairs to hand levers 11, by means of interposed links 12. These levers 11 are fulcrumed about shafts 13, having their bearings protected in appropriate offsets 15 forming part of the hopper structure, and extend through slots 16, in the platforms 17, so as to be conveniently accessible to the operatives. By the arrangement shown, the bars may be adjusted to any desired position in effecting the regulation of the flow from the hopper, and the individual or group coupling permits of selective manipulation so as to relieve any localized congestion of the outlet caused by lumps of the material, or larger pieces of stone contained in the crude mass.

Having thus described my invention, I claim:

1. The combination with a hopper having a discharge outlet; of a gate comprising two opposed series of bars slidable toward each other and adapted to meet across said outlet to close the same and separable to varying distances, to control the discharge from the hopper.

2. The combination with a hopper having a discharge outlet; of a gate for said outlet comprising opposed series of selectively operable bars slidable in planes inclined at a substanial angle to one another and adapted to meet across said outlet to form a closure for the same and separable to varying distances to control the discharge therefrom.

3. The combination with a hopper having inclined sides sloping toward a bottom discharge outlet; of a gate comprising two opposed, complementarily disposed series of bars slidable toward and away from each other, and arranged at inclinations corresponding substantially to the slope of the hopper walls and adapted to meet across the outlet to form a closure and separable to varying distances to control discharge from the hopper.

4. The combination with a hopper and monolithic supporting structure having a discharge outlet; of a gate comprising a series of bars slidable across said outlet to control the discharge from the hopper; and guide tubes within which said bars are slidably supported whereby said tubes may be incorporated into the structure during formation thereof.

5. The combination with a hopper having a substantially unobstructed discharge outlet opening directly downward; of a gate comprising independently operable series of longitudinally slidable bars inclined downward to the centre of said opening from either side thereof, the bars of each series being selectively operable.

6. The combination with a hopper having a substantially unobstructed discharge outlet opening directly downward; of a gate comprising opposed series of longitudinally slidable bars inclined downward and extending through the opposite walls of said hopper across said outlet.

In testimony whereof, I have hereunto signed my name at Philadelphia, Pennsylvania, this fifth day of January, 1920.

FRANCIS J. HILL, Sr.

Witnesses:
 James H. Bell,
 E. L. Fullerton.